United States Patent [19]

Saito et al.

[11] Patent Number: 4,972,497
[45] Date of Patent: Nov. 20, 1990

[54] IMAGE CODING SYSTEM

[75] Inventors: Tomoaki Saito; Atsushi Tanaka, both of Kanagawa, Japan

[73] Assignee: Mitsubishi Denki Kabushiki Kaisha, Tokyo, Japan

[21] Appl. No.: 280,877

[22] Filed: Dec. 7, 1988

[30] Foreign Application Priority Data

Jul. 4, 1988 [JP] Japan .................................. 63-164878

[51] Int. Cl.$^5$ ............................................. G06K 9/00
[52] U.S. Cl. ...................................... 382/56; 358/166; 358/261.3
[58] Field of Search ................... 582/56; 358/166, 138, 358/261.3, 282, 263, 438

[56] References Cited

U.S. PATENT DOCUMENTS

| 4,071,855 | 1/1978 | Wilmer | 358/261.3 |
|---|---|---|---|
| 4,633,296 | 12/1986 | Cham et al. | 358/138 |
| 4,642,698 | 2/1987 | Yamada | 358/261.3 |
| 4,771,471 | 9/1988 | Kitamura | 358/166 |
| 4,791,741 | 1/1989 | Sato et al. | 382/56 |

FOREIGN PATENT DOCUMENTS 62-144282 6/1987 Japan .

OTHER PUBLICATIONS

Mesh-Oriented Line Drawing Theory (MOLD Theory), IEEE Transactions on Patent Analysis and Machine Intelligence, vol. PAMI-8, No. 2, Mar. 1986, pp. 210-221.
Patent Abstracts of Japan, vol. 7, No. 88 (E-170)(1233), Apr. 12, 1983; & JP-A-58 014676 (Nippon Denshin Denwa Kosha) 27.01.1983.
IEEE Transactions on Communications, vol. Com. 31, No. 4, Apr. 1983, pp. 532-540; P. J. Burt et al.: "The Laplacian Pyramid as a Compact Image Code", p. 535, Column 1-Column 2, line 21.
Patent Abstracts of Japan, vol. 12, No. 158 (E-608)(3005), May 13, 1988; & JP-A-62 273535 (OKI Electric Inc.) 25.22.1987.

Primary Examiner—Leo H. Boudreau
Assistant Examiner—Yon Jung
Attorney, Agent, or Firm—Bernard, Rothwell & Brown

[57] ABSTRACT

Image coding system where document retrieval and printing are compatible, comprises first step of dividing a first image into n×n meshes, second processing step of performing resolution conversion of the divided n×n meshes into one dot and obtaining a second image, third processing step of obtaining first data from the first image excluding all white meshes, and final processing step of decoding the first image from the first data and second image. Since a part of code data of the coded image is also provided with image for retrieval, and the first, second, third and final processing steps are executed, document retrieval image decoding processing for a display device (low resolution device) requiring high speed and image processing for an image printer requiring resolution rather than high speed are executed in hierarchy. Thereby low quality image can be obtained from code data of high quality image. Consequently high compression coding of the high quality image utilized in printer output and the document retrieval at high speed by the low quality image utilizing the display device (low resolution) are compatible, and the low quality image can be utilized in document retrieval or the like at high speed without resolution conversion.

4 Claims, 11 Drawing Sheets

IMAGE CODING SYSTEM

BACKGROUND OF THE INVENTION

1. Field of the Invention

The present invention relates to image coding system wherein a binary document image is subjected to compression coding to thereby manage the document image efficiently and high speed retrieval of the document image becomes possible.

2. Description of the Prior Art

Figure 1:
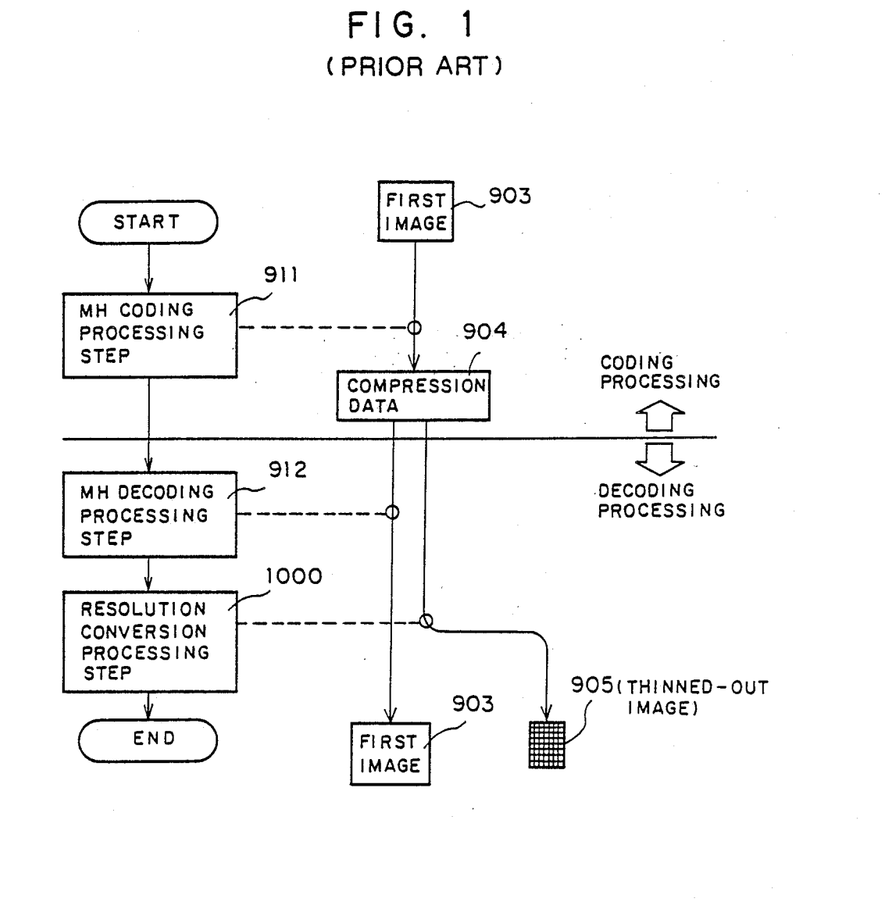
FIG. 1 is a flow chart of the overall decoding processing of MH codes in image coding system of the prior art.

FIG. 1 is a flow chart of an image coding system in the prior art (MH coding system, i.e., modified Huffman coding system), for example, disclosed in Japanese patent application laid-open No. 62-144282. In FIG. 1, numeral 911 designates a MH coding processing step where a first image 903 being original data, is subjected to MH coding and a compression data 904 is obtained, numeral 912 designates a MH decoding processing step where the compression data 904 is subjected to MH decoding back into the first image 903, and numeral 1000 designates a resolution conversion processing step where a thinned-out image 905 is obtained from the first image 903 subjected to MH decoding. The step 1000 continues to step 1001 in FIG. 2.

Figure 2:
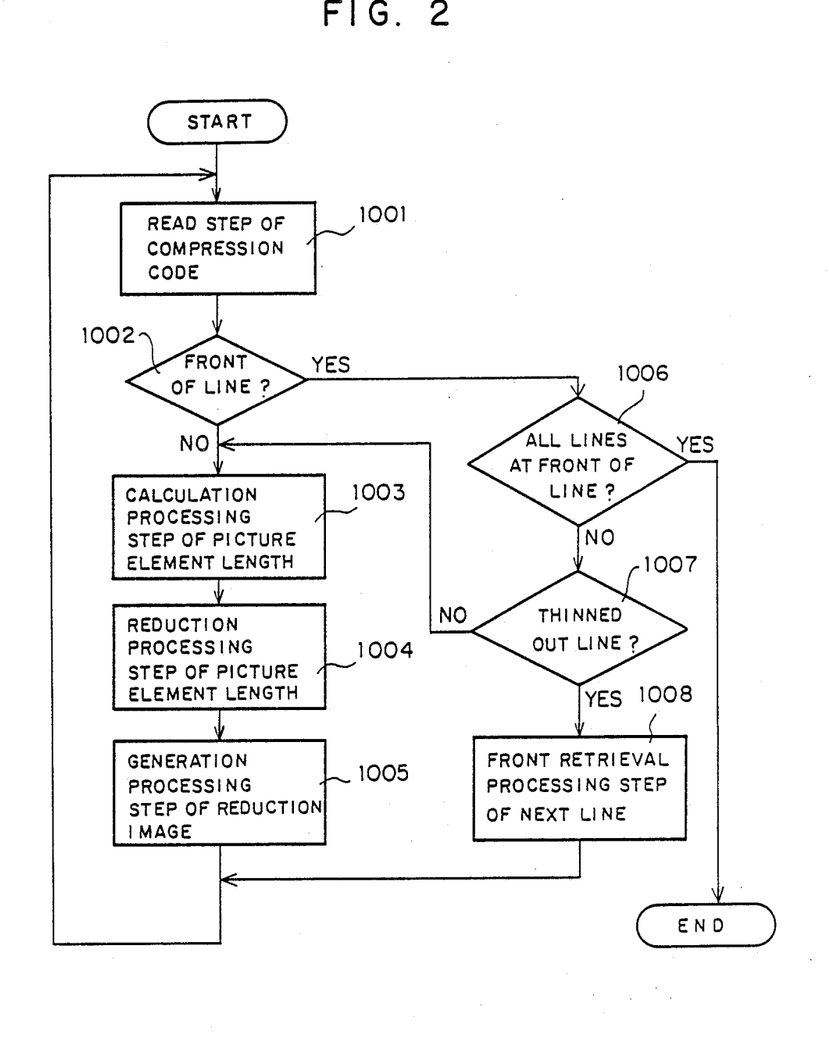
FIG. 2 is a flow chart for obtaining thinned-out image from the MH code data in FIG. 1.

In FIG. 2, numeral 1001 designates a read step of compression codes, numeral 1002 designates a decision step of front of line, numeral 1003 designates a calculation processing step of picture element length, numeral 1004 designates a reduction processing step of the picture element length estimated in step 1003, numeral 1005 designates a generation processing step of the reduction image utilizing the picture element image generated in step 1004, numeral 1006 designates a decision processing step of all lines at the front of line, numeral 1007 designates a decision step of thinned-out line, and numeral 1008 designates a front retrieval processing step of next line in the case of the thinned-out line.

Next, operation will be described. In FIG. 1, the first image 903 is subjected to MH coding according to the MH coding processing step 911; thereby the compression data 904 is obtained. In order to obtain the first image 903 in next MH decoding, the compression data 904 is first decoded according to the MH decoding processing step 912. Also in order to obtain the thinned-out image 905, in addition to the MH decoding, resolution conversion processing must be performed according to step 1000 as hereinafter described referring to FIG. 2.

In FIG. 2, decision of front of line is first performed by the code data read according to the read step 1001 of compression code (step 1002). As a result, if the code is not front of line, the picture element length is calculated (step 1003), and then reduction of the picture element length is performed (step 1004) thereby the reduction image is generated (step 1005). On the other hand, in the case of the front of line being determined in step 1002, decision is performed as to whether all lines come to the end (step 1006). If it is the end, the processing comes to the end, and if it is not the end, decision of thinned-out line is performed (step 1007). If it is thinned-out line, front retrieval of next line is performed (step 1008) and the processing is returned to step 1001.

Since the image coding system in the prior art is constituted as above described, even when the content of a document image is viewed using a display device with low resolution, all data must be read. Further, since the image for retrieval must be estimated by resolution conversion processing, high speed operation is difficult in such a system.

SUMMARY OF THE INVENTION

In order to eliminate the above-mentioned disadvantages in the prior art, an object of the invention is to provide an image coding system wherein high speed operation of document retrieval is realized in the document image control.

An image coding system according to the invention comprises a first processing step of dividing a first image into n x n meshes, a second processing step of performing resolution conversion of the divided n x n meshes into one dot and obtaining a second image, a third processing step of obtaining first data from the first image excluding all white meshes, and a final processing step of decoding the first image from the first data and the second image, wherein a part of code data of the coded image is also provided with image for retrieval.

PREFERRED EMBODIMENT OF THE INVENTION

An embodiment of the invention will now be described referring to the accompanying drawings.

Figure 4:
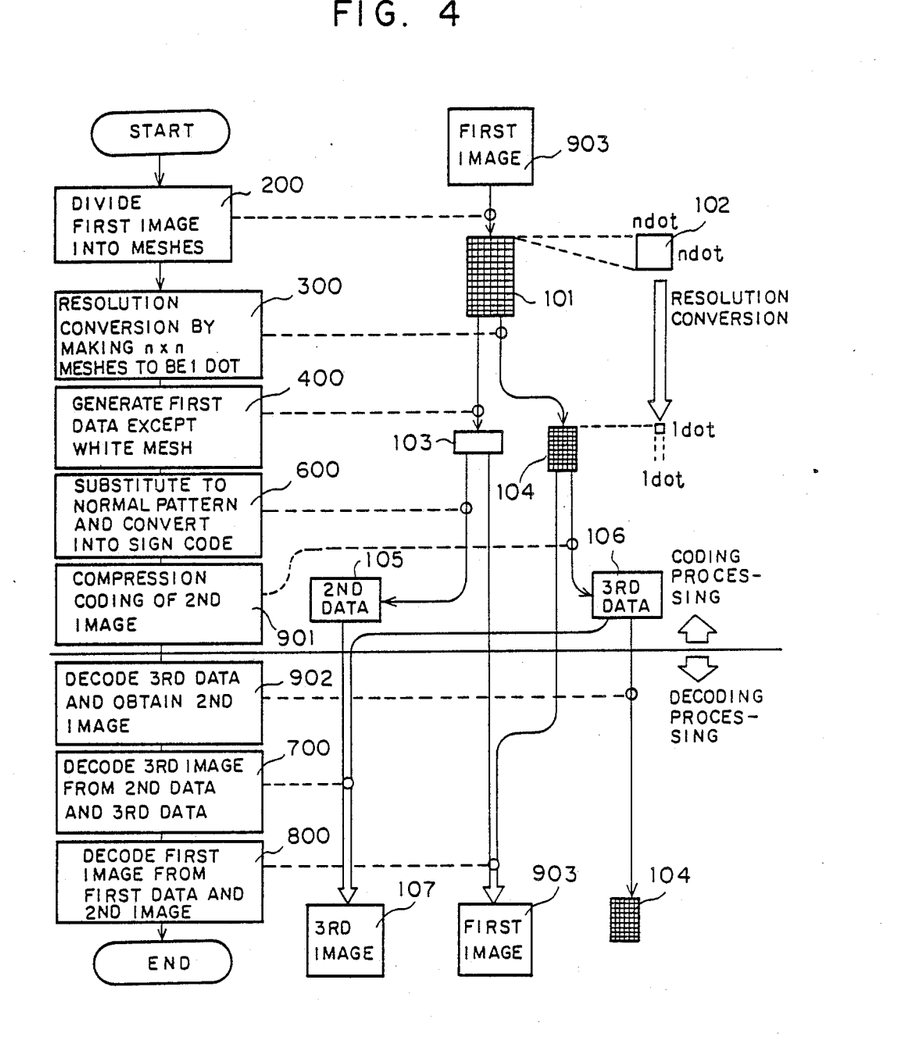
FIG. 4 is a flow chart illustrating the overall operation of image coding system as an embodiment of the invention.

In FIG. 4, numeral 903 designates a first image, being original data, numeral 200 designates first processing step where the first image 903 is divided into [n x n] meshes 102 of n x n dots and an image 101 is obtained, numeral 300 designates a second processing step where the divided n x n meshes 102 are subjected to resolution conversion into one dot and a second image 104 is obtained, numeral 400 designates a third processing step where meshes with all dots being white are removed from the meshes appearing in the image 101 and first data 103 is obtained, numeral 600 designates a fourth processing step where the first data 103 is substituted by the normal pattern and second data 105 expressing the substituted data in sign codes is obtained, numeral 901 designates a fifth processing step where the second image 104 is coded in an arbitrary coding system and third data 106 is obtained, numeral 902 designates a sixth processing step where the third data 106 is decoded and thereby the second image 104 is obtained, numeral 700 designates a seventh processing step where a first image 903 is normalized and the third image 107 is decoded from the second data 105 and the third data 106, and numeral 800 designates an eighth processing step as a final step where the first image 903 is decoded from the first data 103 and the second image 104.

Figure 5:
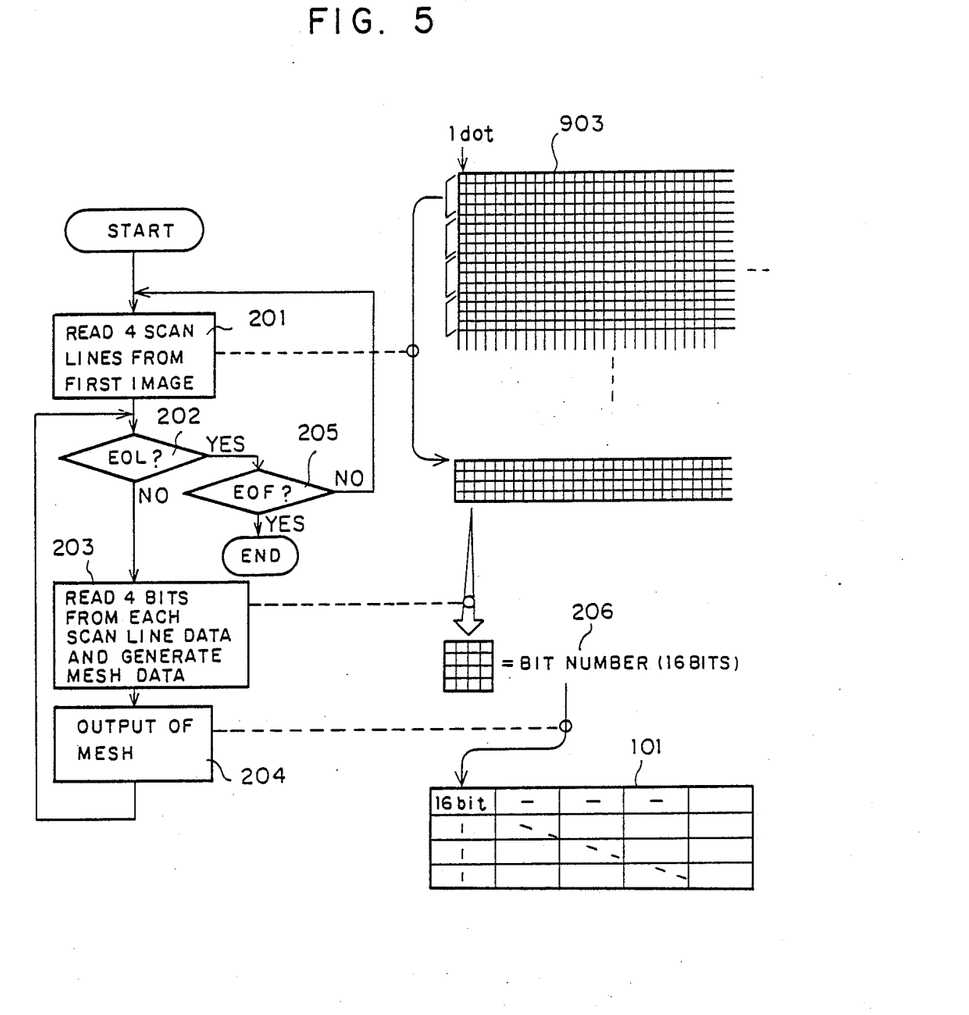
FIG. 5 is a detailed flow chart of first processing step 200.

FIG. 5 shows the details of the first processing step 200. In FIG. 5, numeral 201 designates a read processing step of data of four scan lines from the first image 903, numeral 202 designates a decision processing step of the line end (hereinafter referred to as "EOL"), numeral 203 designates a cutting processing step of the meshes per four scan lines, numeral 204 designates an output processing step of the meshes, and numeral 205 designates a decision processing step of the file end (hereinafter referred to as "EOF").

The bit number 206 signifies the number of bits corresponding to each mesh, and is the number obtained by arranging each dot of the meshes into one line at arbitrary order (For example, in the case of 4×4 meshes, the bit number is expressed by 16 binary digits).

Figure 6:
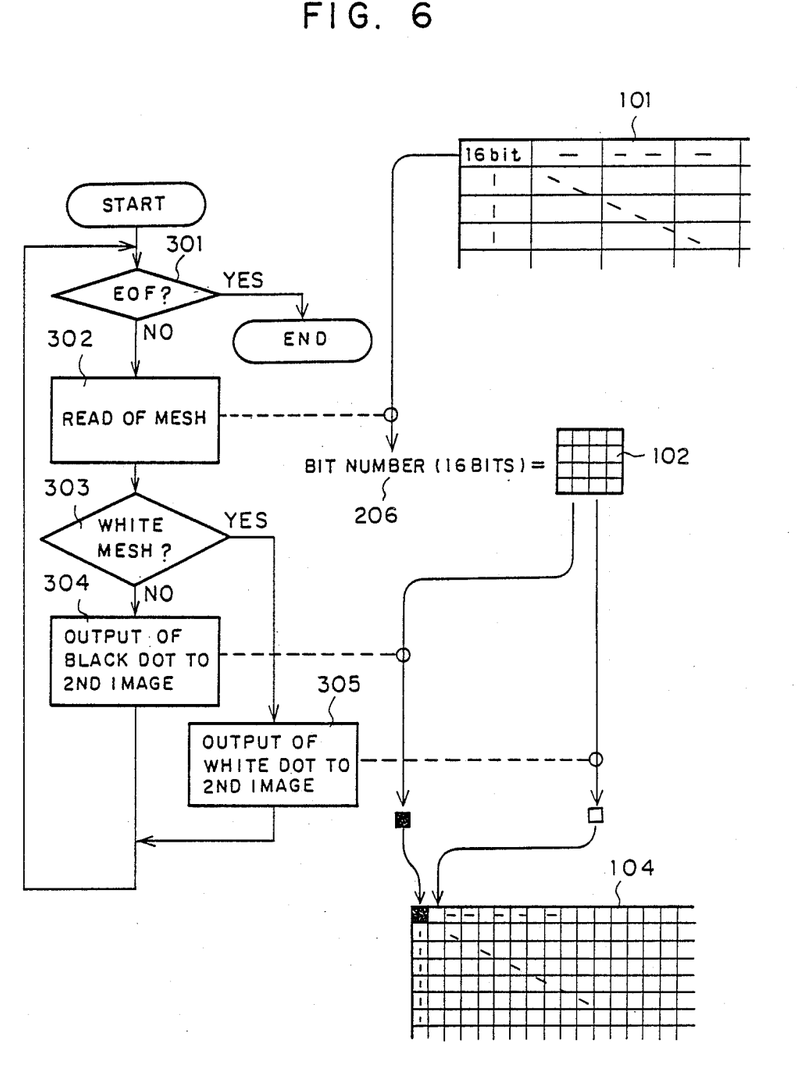
FIG. 6 is a detailed flow chart of second processing step 300.

FIG. 6 shows concrete content of the third processing step 300. In FIG. 6, numeral 301 designates a decision processing step of EOF, numeral 302 designates a read processing step of mesh data, numeral 303 designates a decision processing step of white mesh, numeral 304 designates an output processing step of black dots into the second image 104, and numeral 305 designates output processing step of white dots into the second image 104.

Figure 7:
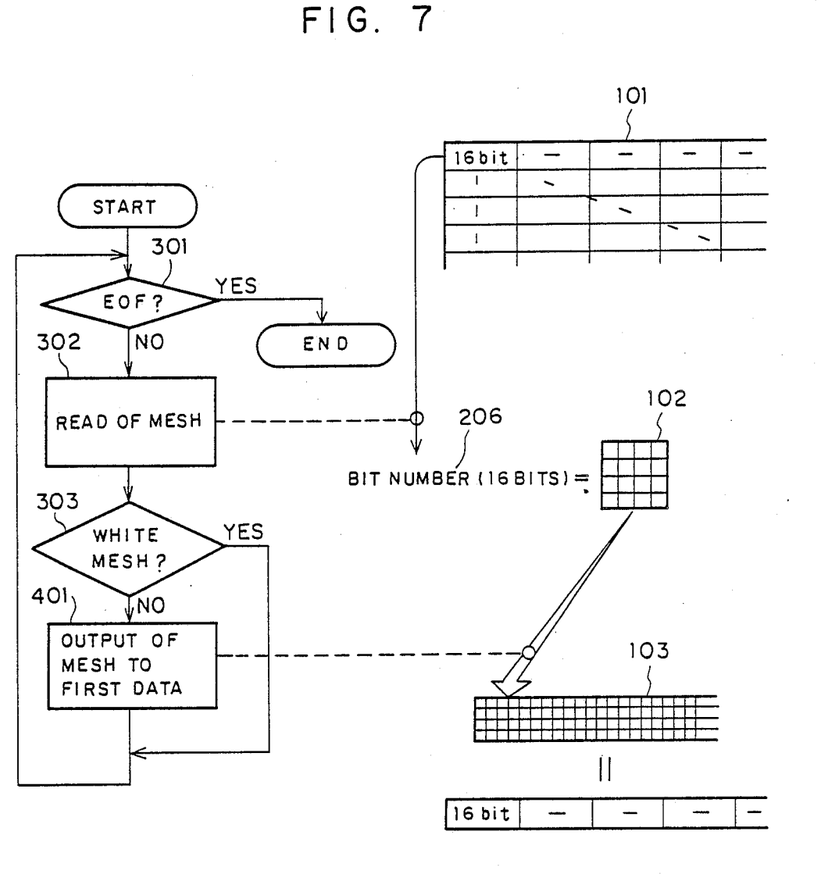
FIG. 7 is a detailed flow chart of third processing step 400.

FIG. 7 shows concrete content of the third processing step 400. In FIG. 7, numeral 401 designates output processing step of the meshes 102 into the first data 103. Steps 301–303 correspond to the steps in FIG. 6.

Figure 8:
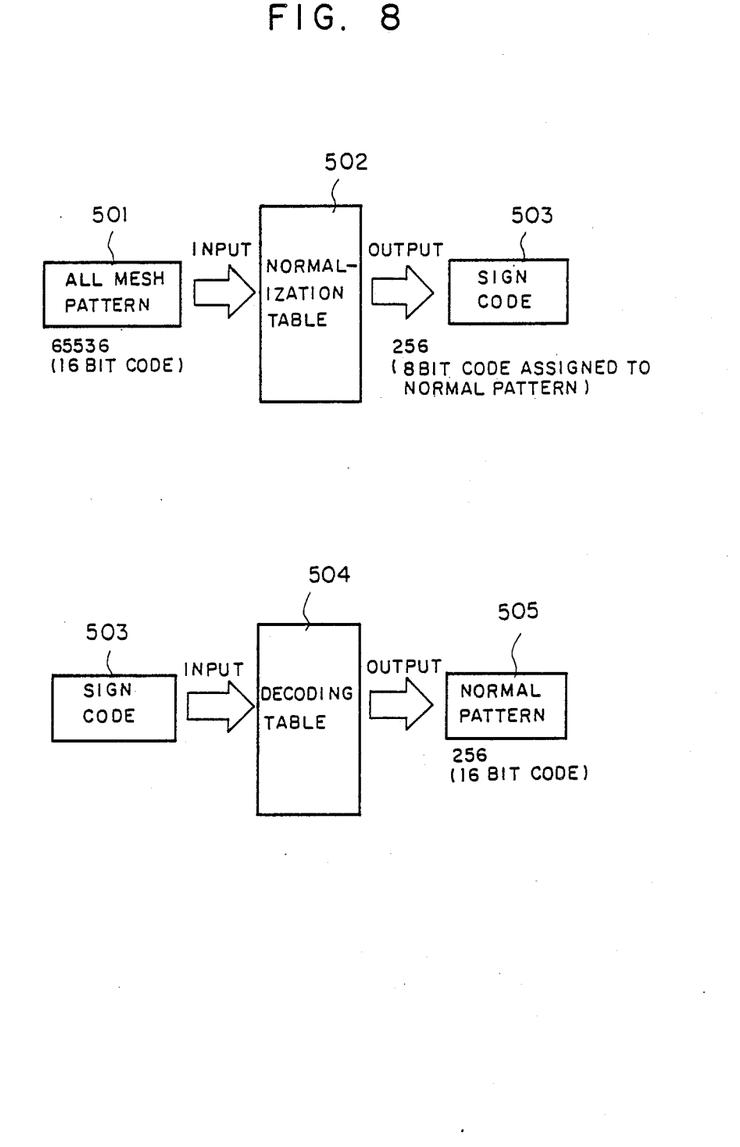
FIG. 8 is an explanation diagram illustrating input/output data regarding a normalization table 502 used in the coding processing and a decoding table 504 used in the decoding processing.

FIG. 8 shows input and output regarding a normalization table used in the coding processing and a decoding table used in the decoding processing. In FIG. 8, numeral 502 designates a normalization table, numeral 501 designates a mesh pattern input to the table 502, and numeral 503 designates a sign code output thereof. Also numeral 504 designates a decoding table, numeral 503 designates a sign code inputted to the table 504, and numeral 505 designates a normal pattern outputted from the table 504.

The normalization table 502 stores normal patterns corresponding to input mesh patterns. For example, statistics of pattern of meshes (4×4 meshes are composed of 16 bits, and thus $2^{16}$ patterns (=65536) exist.) appearing in the first image 903 are taken, and among these patterns, $2_8$ (=256) patterns with the highest appearing frequency are selected (This is called the normal pattern 505), and corresponding to the normal pattern 505, the sign codes 503 (The sign codes are expressed by one byte of 8 bits (=256) of code length.) are assigned to patterns 0 ~ 255. The mesh patterns not included in the normalization table 502 are approximated to the most similar mesh pattern in the normalization table thereby all mesh patterns 501 are converted into the sign codes 503.

The decoding table 504 converts the sign codes 503 into the corresponding normal patterns 505 of 16 elements. The normal patterns 505 in this case are all expressed in the bit number 206.

Figure 9:
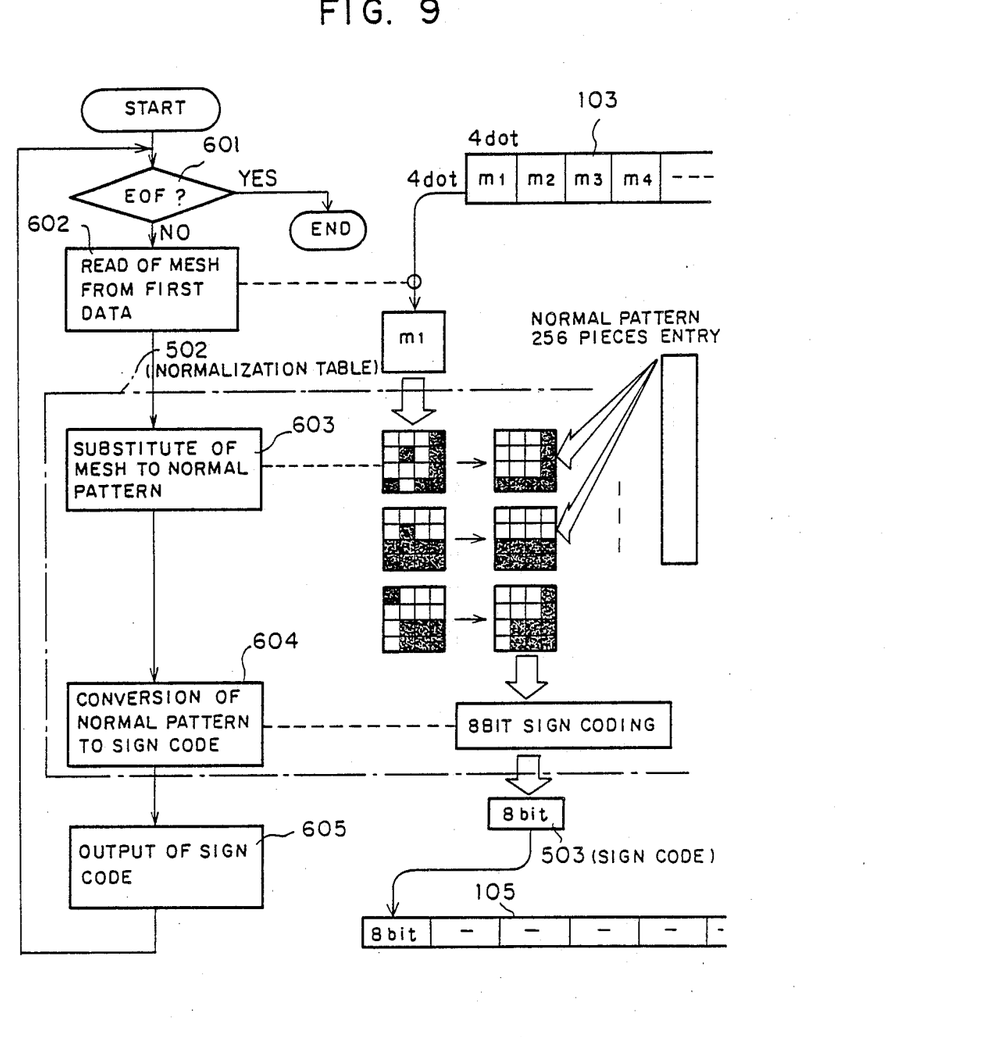
FIG. 9 is a detailed flow chart of fourth processing step 600.

FIG. 9 shows the details of the fourth processing step 600. In FIG. 9, numeral 601 designates a decision processing step of EOF, numeral 602 designates a read processing step from the first data 103 into the meshes 102, numeral 603 designates a normalization processing step for substituting the meshes 102 with the normal patterns 505, numeral 604 designates a conversion processing step for converting the normalization patterns 505 into the sign codes 503, and numeral 605 designates an output processing step of the sign codes 503 into the second data 105.

Figure 10:
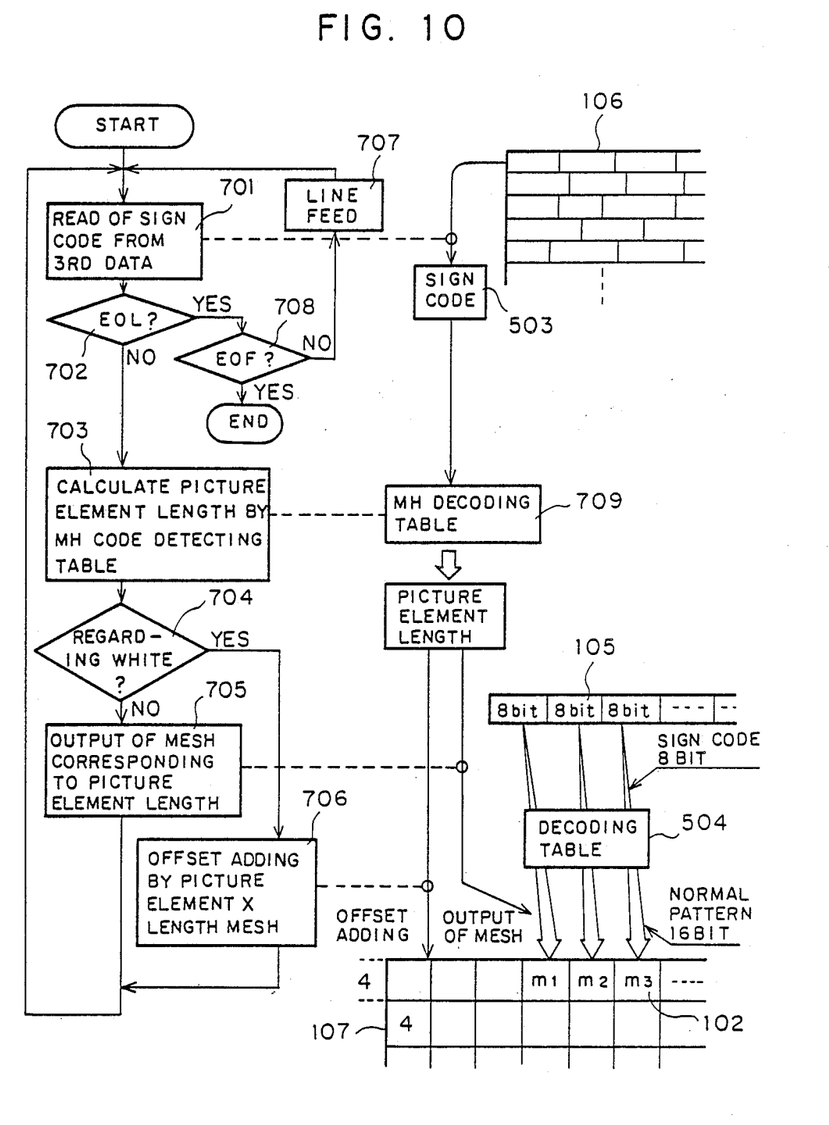
FIG. 10 is a detailed flow chart of seventh processing step 700.

FIG. 10 shows the details of the seventh processing step 700. In FIG. 10, numeral 701 designates a read processing step of the MH sign codes from the third data 106, numeral 702 designates a decision processing step of EOL, numeral 703 designates a calculation processing step of picture element length of the sign codes from an MH decoding table 709, numeral 704 designates a decision processing step of whether it relates to white or not, numeral 705 designates an output processing step of the meshes 102 corresponding to the picture element length, numeral 706 designates an offset adding processing step of the picture element length x the mesh width, numeral 707 designates a line feed processing step, and numeral 708 designates a decision processing step of EOF.

The picture element length means the length that black dots or white dots continue, and the offset adding means address skip of white mesh drawing portion (Anything that need not be drawn.) in the decoding processing.

Figure 11:
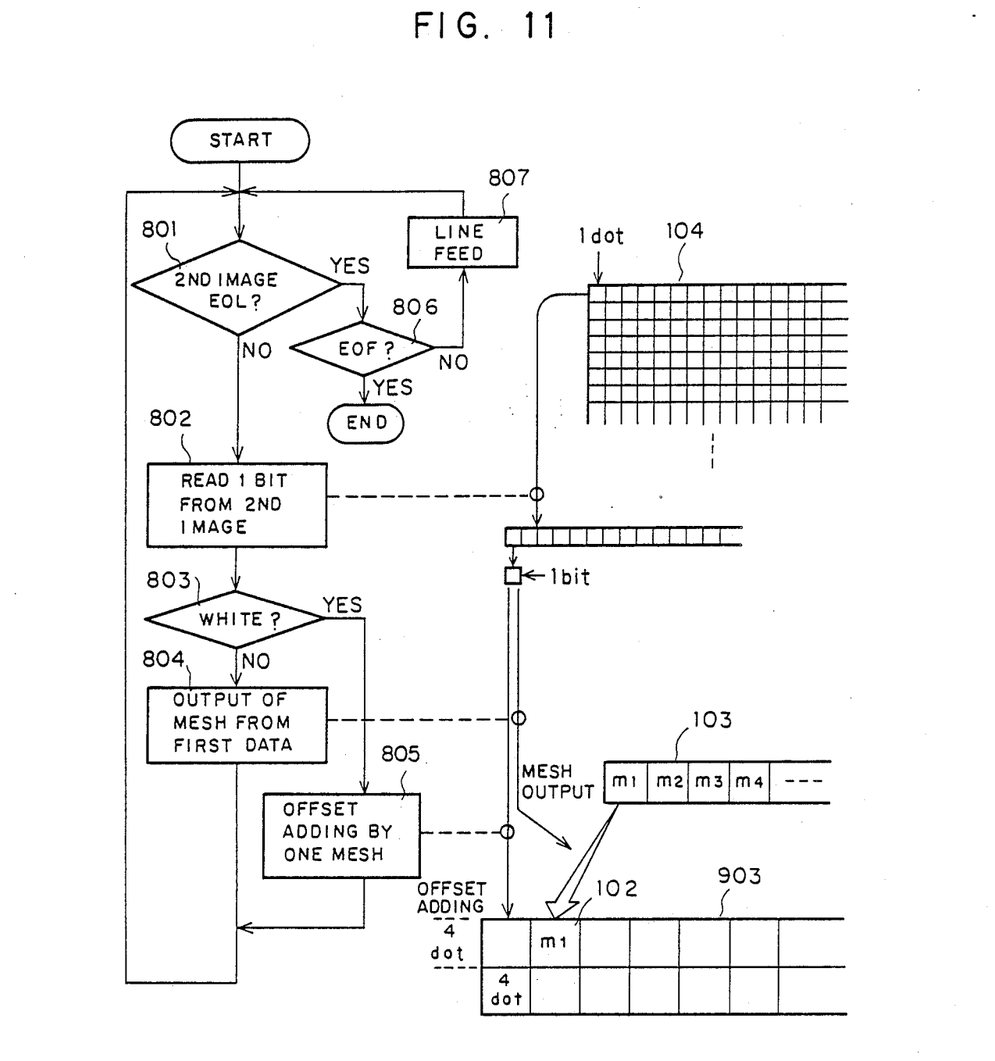
FIG. 11 is a detailed flow chart of eighth processing step 800.

FIG. 11 shows the details of the eighth processing step 800. In FIG. 11, numeral 801 designates a decision processing step of EOL of the second image 104, numeral 802 designates a one-bit read processing step from the second image 104, numeral 803 designates a decision processing step of whether the read bit is white or not, numeral 804 designates an output processing step of the meshes 102 from the first data 103 into the first image 903, numeral 805 designates an offset adding processing step corresponding to one mesh 102, numeral 806 designates a decision processing step of EOF, and numeral 807 designates a line feed processing step of the first image 903 and the second image 104.

Figure 3:
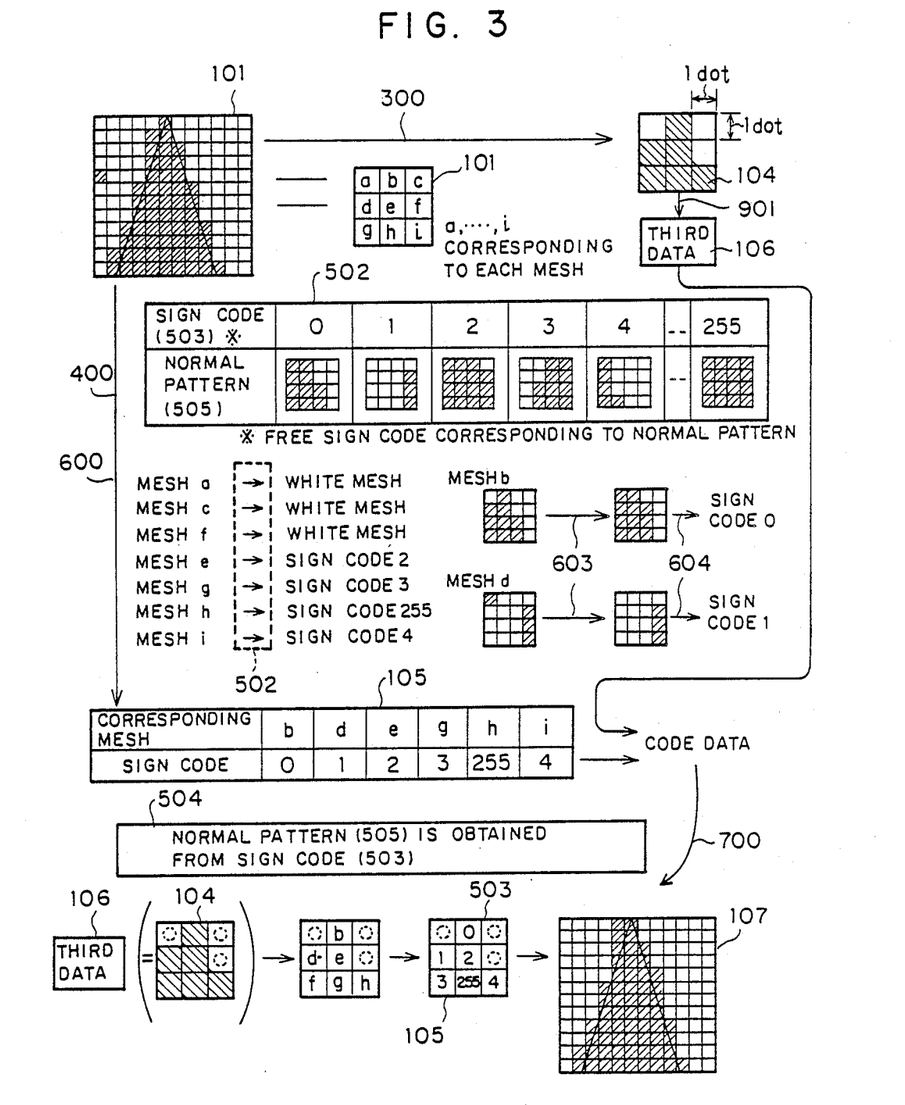
FIG. 3 is a flow chart of a specific embodiment of the present invention.

Next, operation of the specific embodiment shown in FIG. 3 will be described. First, according to the first processing step 200, the first image 903 is divided into the 4×4 meshes 102. In the step 200, as shown in FIG. 5, data corresponding to the four scan lines is first read (step 201). In this case, four bits are read from each scan line (step 203; thereby the 4×4 meshes 102 are produced and then outputted (step 204). Next, decision of EOL is performed (step 202). If it is EOL, decision of EOF is performed (step 205). If it is EOF, the processing ends, and if it is not EOF, the processing is returned to step 201 again.

Next, the processing advances to the second processing step 300, and each of the 4×4 meshes 102 is made one dot thereby the resolution conversion is performed. The detailed content of the second processing step is shown in FIG. 6. First, the mesh 102 is read (step 302) and then decision is performed of whether the mesh 102 is white or not (step 303). If all bits of the mesh 102 are white the second image 104 is made a white dot (step 305). If black is included, the second image 104 is made a black dot (step 304); thereby the resolution conversion is performed. Next, decision of EOF is performed (step 301). If it is EOF, the processing ends, and if it is not EOF, the processing is returned to step 201. Next, the processing advances to the third processing step 400, and the first data except for white mesh is produced. The detailed content of the third processing step 400 is shown in FIG. 7. The mesh 102 is read (step 302), and then decision is performed of whether the mesh 102 is white mesh or not (step 303). If all bits of the mesh 102 are white, it is ignored. If black is included, the mesh 102 is outputted (step 401) whereby the first data 103 is produced.

Next, the processing advances to the fourth processing step 600, and the non-white meshes 102 are substituted by the normal pattern and converted into the sign codes 503. The detailed content of the fourth processing step 600 is shown in FIG. 9. The mesh 102 is read from the first data 103 (step 602), and then normalized into the normal pattern 505 (step 603). The normal pattern 505 is converted into the sign codes 503 (step 604), and then the sign codes 503 are outputted (step 605); thereby the second data 105 is produced.

Next, the second image 104 is subjected to the MH coding according to the fifth processing step 901; thereby the third data 106 is produced.

Procedure of the coding has been described, and procedure of decoding will now be described.

First, decoding of an image with low resolution for document retrieval will be described.

In the sixth processing step 902, the third data 106 is subjected to the MH decoding (step 902) thereby the second image 104 is produced.

Next, the decoding processing of high quality image will be described.

In the seventh processing step 700, the third image 107 is produced from the second data 105 and the third data 106. The detailed content of the seventh processing step 700 is shown in FIG. 10. The sign code 503 is read from the third data 106 (step 701), and then decision of EOL is performed (step 702). If it is EOL, decision of EOF is performed (step 708). If it is EOF, the processing ends, and if it is not EOF, the line feed processing is performed (step 707). On the other hand, if it is not EOL in step 702, the picture element length is calculated from the sign codes 503 according to the decoding table 504 (step 703), and then decision regarding white is performed (step 704). If it is white, the offset is added corresponding to the mesh width x the picture element length (step 706). On the other hand, if it is black, the decoding table 504 is utilized and the normal pattern 505 is obtained from the sign codes 503 thereby the meshes corresponding to the number of the picture element length are outputted to the third image 107.

Next, the processing advances to the eighth processing step 800, and the third image 107 is decoded from the first data 103 and the second image 104. The detailed content of the eighth processing step 800 is shown in FIG. 11. One bit is read from the second image 104 (step 802), and then decision is performed of whether the bit is white or not (step 803). If it is white, the offset corresponding to one mesh is added to the first image being output (step 805). On the other hand, if it is black, one mesh from the first data 103 is outputted to the first image 903 (step 804).

The EOL decision of the second image 104 is performed (step 801). If it is EOL, the EOF decision is performed (step 806). If it is EOF, the processing ends, and if it is not EOF, the line feed processing of the second image 104 and the first image 903 is performed (step 807).

Although the mesh size is made four in the embodiment, this may be another size. Also although the sign code 503 (=the normal pattern 505) is made one byte code (256 patterns), this may be increased or decreased corresponding to property of the treated image. Further, although the MH code is used in the compression coding of the second image 104, this may be another code or the coding need not be performed and similar effects to that of the embodiment can be obtained.

Further a specific embodiment will be described referring to FIG. 3.

First the coding processing will be described.

The first image 101 divided into the meshes 102 is subjected to the resolution conversion 300 so that the white mesh is made a white dot and any other mesh is made a black dot; thereby the second image 104 is obtained. Further, the second image 104 is subjected to the MH coding 901 and thereby the third data 106 is obtained. Next, utilizing the normalization table 502 for the first image 101, the meshes 400 except for white meshes are subjected to the sign coding 600 thereby the second data is obtained. In the normalization table 502 is used a part of that produced according to the MOLD Theory.

The second data 105 and the third data 106 are estimated thereby the coding processing is finished.

Next the decoding processing will be described.

The sign code 503 of the second code data 105 is converted according to the decoding table 504, and the normal pattern 505 obtained by the conversion is put in corresponding black dot portion according to the position information of black dots possessed by the third data 106, and white dots are put in white dot portion (step 700) thereby the third image 107 is decoded.

Mesh-oriented line drawing (MOLD) theory, which is relevant to the subject application, is discussed in a publication entitled Mesh-Oriented Line Drawings Theory (MOLD Theory) IEEE TRANSACTIONS ON PATTERN ANALYSIS AND MACHINE INTELLIGENCE, VOL. PAMI-8, No. 2, MARCH 1986 MICHIKO MINOH AND TOSHIYUKI SAKAI.

As above described, the invention is in an image coding system comprising first processing step of dividing a first image into n x n meshes, second processing step of performing resolution conversion of the divided n x n meshes into one dot and obtaining a second image, third processing step of obtaining first data from the first image excluding all white meshes, and final processing step of decoding the first image from the first data and the second image.

Further the invention is characterized in following items.

(1) The invention comprises fifth processing step of coding the second image in arbitrary coding system and obtaining third data, and sixth processing step of decoding the third image and obtaining the second image.

(2) The invention comprises fourth processing step of substituting the first data by an arbitrary normal pattern and obtaining second data by expression of the normal pattern in sign code, and seventh processing step of normalizing the first image and generating a third image from the second data and the third data.

(3) The normal pattern is that selected from relation between the property of the first image and the n x n meshes.

(4) In the fourth processing step is utilized a normalization table where a sign code is assigned to the normal pattern.

(5) In the second data decoding in the seventh processing step is utilized a decoding table where the sign code corresponds to the original normal pattern.

What is claimed is:

1. An image coding method, comprising the steps of:

dividing a first image into meshes of n x n dots, n being an integer, said dots being either black or white;

converting the resolution of said first image by converting each n x n dot mesh into a mesh of one dot to obtain a second image;

obtaining first data from said first image by excluding all white meshes therefrom;

substituting predetermined normal mesh patterns for the meshes of said first data to obtain second data of a sign code corresponding to said normal mesh patterns;

coding said second image using an arbitrary data compression code to obtain third data;

decoding said third data with said arbitrary code to regenerate said second image;

regenerating said first image by decoding said first data and said second image; and generating a third image by decoding said second data and said third data.

2. An image coding method according to claim 1, wherein said normal mesh patterns are selected by determining the most frequently occurring n x n meshes of said first image and selecting a predetermined number of said most frequently occurring meshes as said normal mesh patterns.

3. An image coding method according to claim 1, wherein a normalization table is utilized in assigning a sign code word to each of said normal mesh patterns.

4. An image coding method according to claim 1, wherein a decoding table is utilized in decoding said second data into said normal mesh patterns.

* * * * *

UNITED STATES PATENT AND TRADEMARK OFFICE
CERTIFICATE OF CORRECTION

PATENT NO. : 4,972,497

DATED : November 20, 1990

INVENTOR(S) : Tomoaki Saito and Atsushi Tanaka

It is certified that error appears in the above-identified patent and that said Letters Patent is hereby corrected as shown below:

Title page, column 1, first line under "OTHER PUBLICATIONS", "Drawing should be --Drawings--;

second line under "OTHER PUBLICATIONS", "Patent" should be --Pattern--;

sixth line under "OTHER PUBLICATIONS", "014676" should be --014674--.

Title page, column 2, line 4, "273535" should be --271525--;

line 5, "Inc.) 25.22.1987." should be --Ind.) 25.11.1987.--.

Column 1, line 6, "system" should be --systems--;

line 17, after "903" insert a comma --,--.

Column 2, line 57, after "designates" insert --a--.

Column 3, line 8, "the" should be --a--;

line 54, "pattern" should be --patterns--;

line 57, "$2_8$" should be --$2^8$--;

line 65, after "table" insert a semicolon --;--.

UNITED STATES PATENT AND TRADEMARK OFFICE
CERTIFICATE OF CORRECTION

PATENT NO. : 4,972,497

DATED : November 20, 1990

INVENTOR(S) : Tomoaki Saito and Atsushi Tanaka

It is certified that error appears in the above-identified patent and that said Letters Patent is hereby corrected as shown below:

Column 6, line 59, "image" (first occurrence) should be --data--.

Signed and Sealed this

Fourteenth Day of July, 1992

Attest:

DOUGLAS B. COMER

*Attesting Officer*   *Acting Commissioner of Patents and Trademarks*